United States Patent

Kubilos

[11] 3,955,369
[45] May 11, 1976

[54] ACTUATOR AVERAGE PRESSURE MAINTENANCE IN CLOSED LOOP SYSTEM

[75] Inventor: Charles A. Kubilos, Oxnard, Calif.

[73] Assignee: Abex Corporation, New York, N.Y.

[22] Filed: Apr. 16, 1975

[21] Appl. No.: 568,488

[52] U.S. Cl. ............................. 60/445; 60/446; 60/464; 60/486
[51] Int. Cl.² ..................................... F16H 39/46
[58] Field of Search ............ 60/388, 390, 391, 428, 60/430, 445, 446, 464, 465, 486

[56] References Cited
UNITED STATES PATENTS

| | | | |
|---|---|---|---|
| 3,214,911 | 11/1965 | Kempson | 60/464 X |
| 3,713,291 | 1/1973 | Kubik | 60/446 |

*Primary Examiner*—Edgar W. Geoghegan
*Attorney, Agent, or Firm*—Thomas S. Baker, Jr.; David A. Greenlee

[57] ABSTRACT

A closed loop hydraulic control system for a piston type fluid actuator maintains an average pressure on the piston during all operating conditions of the actuator. The system includes a first pump which controls the actuator and a makeup pump which supplies additional fluid to compensate for fluid losses in the system. An average pressure maintaining valve sums the fluid pressure on each side of the actuator and supplies additional fluid from the makeup pump to maintain a predetermined average pressure on the actuator piston.

16 Claims, 6 Drawing Figures

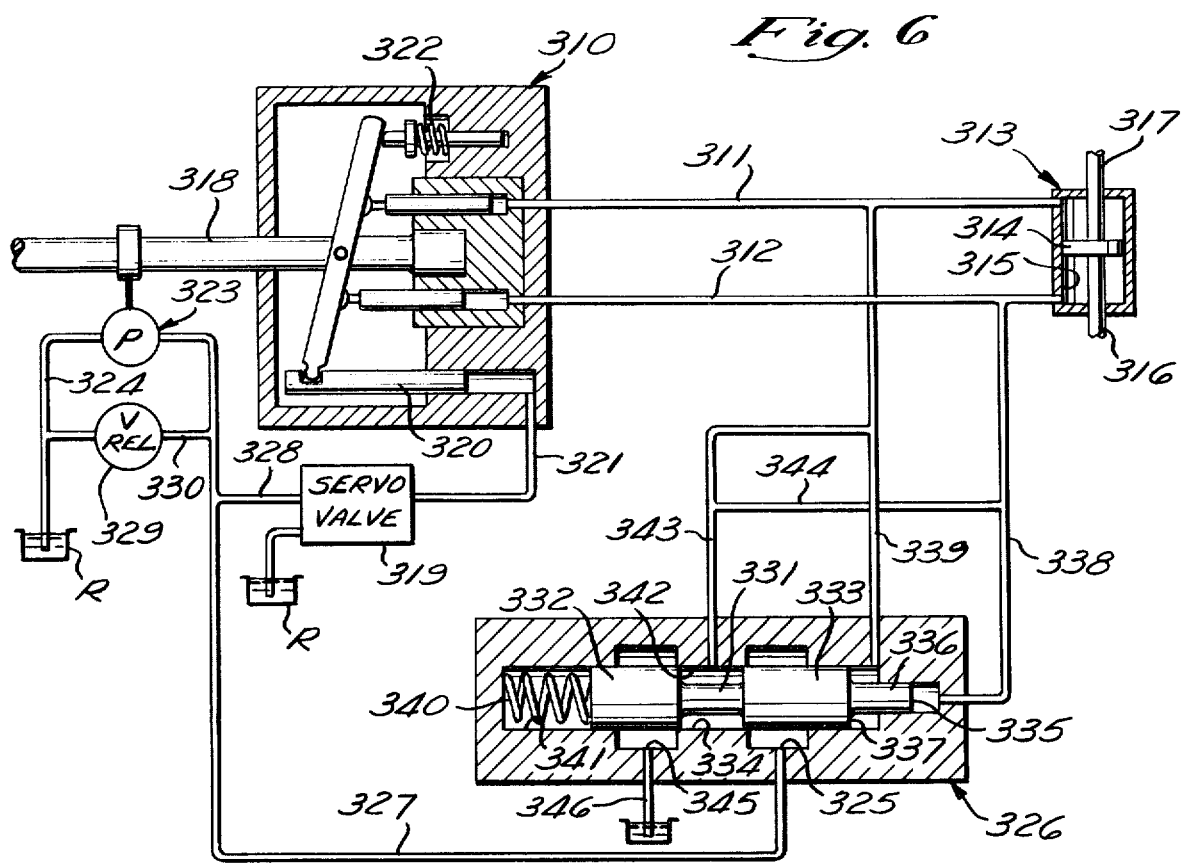
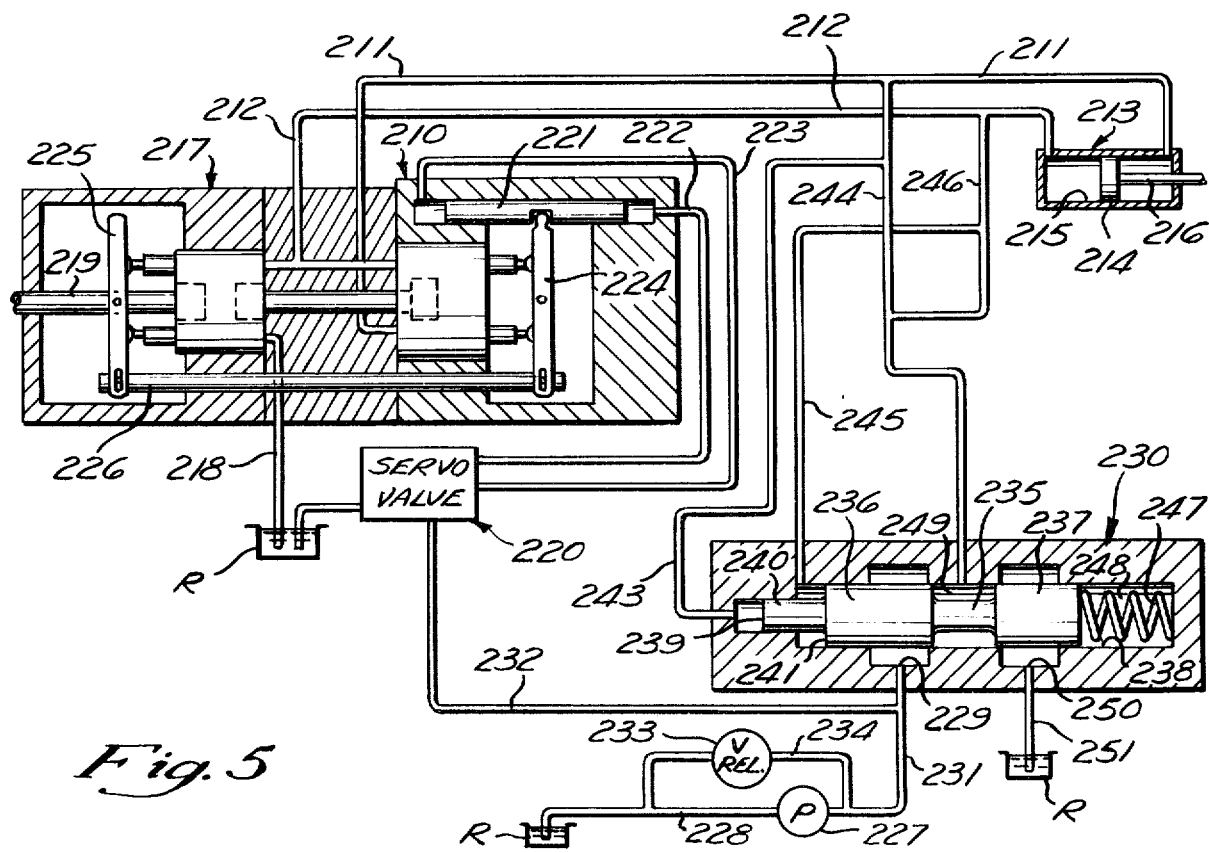

3,955,369

ACTUATOR AVERAGE PRESSURE MAINTENANCE IN CLOSED LOOP SYSTEM

BACKGROUND OF THE INVENTION

1. Field of the Invention

The instant invention relates to a closed loop hydraulic control system which maintains an average pressure in a fluid actuator and permits the pressure on each side of the actuator to change in response to load changes.

2. Description of the Prior Art

A fluid actuator, such as a piston and cylinder, is commonly used to operate or position such devices as a control surface on an aircraft. External forces on such surfaces can produce "flutter" or dangerous high frequency oscillations. An important factor in controlling flutter is to maintain a high amount of "stiffness," or force on the actuator piston to resist movement. An actuator will have maximum stiffness when fluid pressure in both chambers in the actuator can respond to a wide range of load changes.

A single pump driven by a prime mover has been used to control a balanced actuator, i.e. one in which equal volumes of fluid are displaced on either side of the piston during operation. However, a single pump system has one side of the actuator connected to suction pressure. A disadvantage of this system is that fluid pressure in the side of the actuator connected to suction pressure can only respond within a narrow range of pressures. Consequently, actuator stiffness is less than what it would be with both sides responding to a wide range of load changes.

Frequently an unbalanced actuator, i.e. one in which different volumes of fluid are displaced on either side of the piston during operation, is used in a control system. To use an unbalanced actuator with a servo pump, a shuttle valve, which connects one side of the actuator to a separate fluid supply while the other side is connected to tank, may be used to provide the differential flow required. A disadvantage of this arrangement is that the side of the actuator which is connected to tank can only respond to a narrow range of load changes. Thus, again, there is a loss of stiffness in the system.

It is desirable to have a fluid actuator in a closed loop system in which both sides of the actuator piston can respond to a wide range of load changes by permitting the pressure on both sides of the piston to fluctuate in response to external loads applied to a device operated by the actuator, but limiting the sum of the pressures to a predetermined level.

SUMMARY OF THE INVENTION

The instant invention provides a control system for a hydraulic actuator which maintains the sum of the pressures on each side of the actuator piston at a predetermined level during all operating conditions of the actuator.

A first variable displacement pump supplies fluid to one side and receives fluid from the other side of the actuator piston to operate the actuator.

In the first embodiment a second variable displacement pump supplies additional fluid to the head end of an unbalanced fluid actuator when the actuator is being extended and conducts excess fluid from the head end of the actuator to reservoir when the actuator is being retracted. The second pump has a displacement control connected to the displacement control of the first pump by an adjustable linkage to provide simultaneous operation of the two pumps.

Fluid pressure is maintained on the actuator piston by adjusting the linkage so that the second pump is stroked to displace a slight flow to the actuator when the first pump is off stroke. This flow makes up fluid leakage in the system. The amount of stroke is controlled to match the fluid leakage and maintain an average pressure on the piston by an average pressure maintaining valve.

The average pressure maintaining valve sums the pressures on each side of the actuator to produce an average pressure. If the average pressure drops below a predetermined level, the valve operates the adjustable linkage to change the displacement of the second pump until the average pressure on the actuator piston is raised to the predetermined level. Likewise, if the average pressure exceeds the predetermined level, the valve operates the adjustable linkage to change the second pump displacement until the average pressure on the actuator piston is reduced to the predetermined level.

Each side of the actuator piston is connected through a pressure limiting compensator valve to opposite sides of a displacement control piston on the first pump. If the pressure on either side of the actuator exceeds a predetermined level, the pressure limiting compensator valve supplies fluid to shift the displacement control piston and reduce the displacement of the first pump until the pressure falls to the predetermined level.

In a second embodiment a pair of pumps supplies fluid to operate an unbalanced actuator and a makeup pump supplies fluid to one side or the other of the actuator through an average pressure maintaining valve to make up fluid losses in the system.

In a third embodiment a single pump supplies fluid to operate a balanced actuator and a makeup pump supplies fluid to one side or the other of the actuator through an average pressure maintaining valve to make up fluid losses in the system.

In all of these control systems a predetermined average pressure is maintained on the actuator piston.

DESCRIPTION OF THE DRAWINGS

FIG. 5 is a schematic diagram of the second embodiment of a basic closed loop hydraulic system incorporating the instant invention, showing an auxiliary source of makeup fluid.

FIG. 6 is schematic diagram of a third embodiment of a basic closed loop hydraulic system incorporating the instant invention for a balanced actuator.

DESCRIPTION

Figure 2:
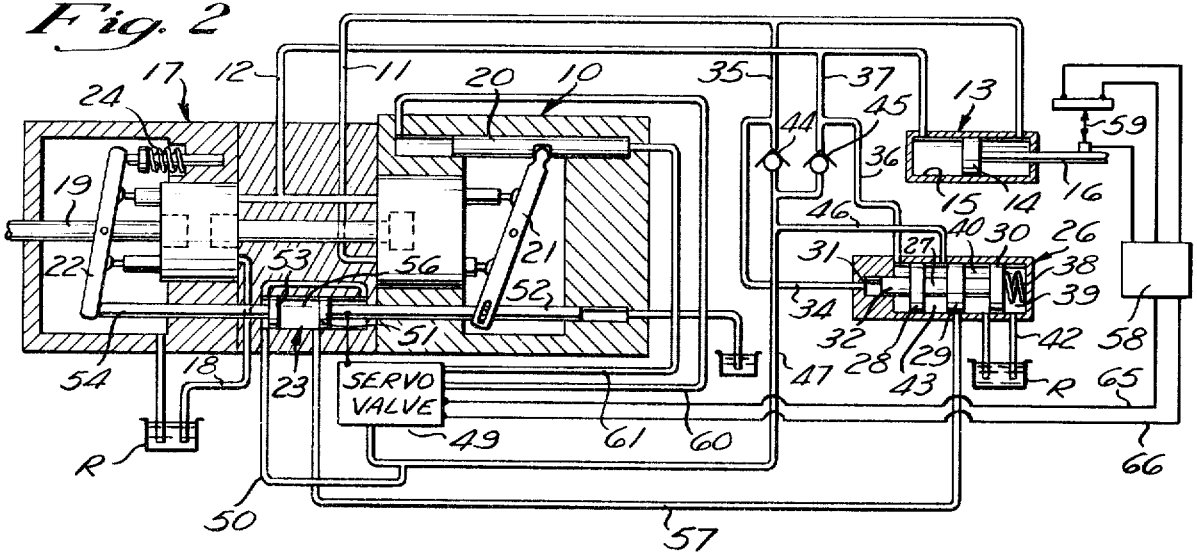
FIG. 2 is similar to FIG. 1, but shows the position of the pump linkages when the fluid actuator is being retracted.
Figure 1:
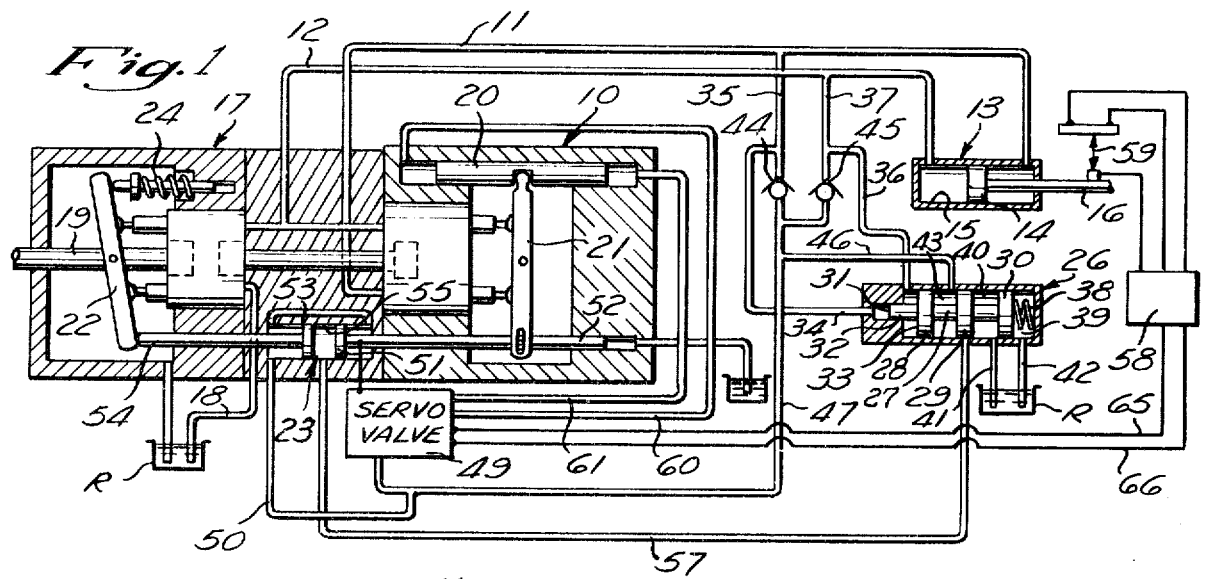
FIG. 1 is a schematic diagram of the first embodiment of a basic closed loop hydraulic system incorporating the instant invention and shows the position of the pump linkages when the fluid actuator is stationary.
Figure 3:
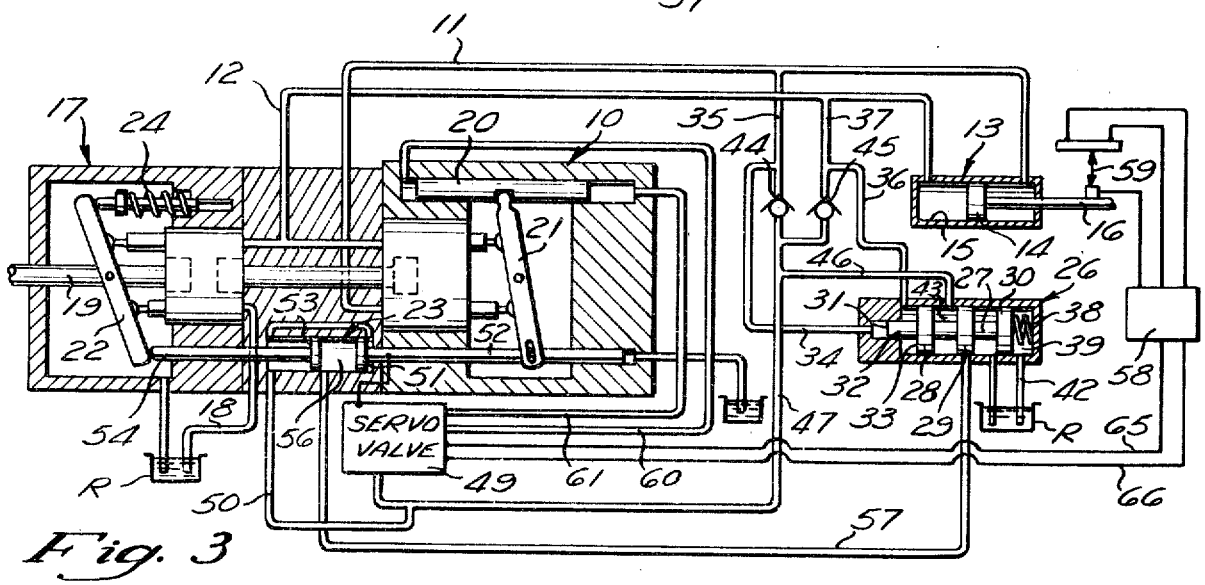
FIG. 3 is similar to FIG. 1, but shows the position of the pump linkages when the fluid actuator is being extended.

FIGS. 1-3 show a closed loop hydraulic system for controlling the fluid pressure on a third actuator, according to the instant invention. A first variable displacement axial piston pump 10 is connected through hydraulic lines 11 and 12 to an unbalanced fluid actuator 13. Actuator 13 has a movable piston 14 which reciprocates in a cylinder 15 and a rod 16 which is attached to piston 14 and projects from one end of the actuator 13 for attachment to a load, not shown.

A second variable displacement axial piston pump 17 is connected to the head end of actuator 13 through line 12 and to a reservoir R through line 18. Pump 17 supplies additional fluid from reservoir R to the head end of actuator 13 when it is being extended and conducts excess fluid from the head end to reservoir R when it is being retracted. This is necessary since the unbalanced actuator 13 displaces unequal volumes of fluid on each side of the piston 14 when it is operated and requires higher rod end pressure than head end pressure to maintain piston 14 in a neutral position or to retract piston 14.

The pumps 10, 17 are driven by a prime mover, not shown, from a shaft 19. A displacement control piston 20 simultaneously controls the displacement of both pumps 10 and 17. Piston 20 is connected to pump 10 through a pivoted mechanical link 21. A similar link 22 on pump 17 is connected to link 21 through an adjustable linkage 23. A spring 24 maintains link 22 in contact with linkage 23. In this way pump 17 automatically supplies additional fluid or swallows excess fluid when pump 10 operates actuator 13.

Pump 17 maintains an average pressure on actuator piston 14 by displacing sufficient makeup pressure fluid to compensate for fluid lost through leakage in the hydraulic system in addition to what it displaces when actuator 13 is moved. The amount of fluid displaced by pump 17 to make up for leakage is dependent upon the length of adjustable linkage 23. In FIG. 1 linkage 23 is adjusted so that pump 17 provides just enough fluid to make up leakage in the system when pump 10 is not in stroke.

The length of adjustable linkage 23 is regulated by an average pressure maintaining valve 26 which sums the fluid pressure on both sides of piston 14 and arrives at an average pressure, which it maintains. Valve 26 has a movable spool 27 with three lands 28, 29 and 30. Land 28 has a first area 31 formed on a projection 32 and an equal second area 33 formed around the base of projection 32. Area 31 is connected to rod end fluid pressure of actuator 13 through lines 34, 35 and 11, while area 33 is connected to head end fluid pressure of actuator 13 through lines 36, 37 and 12. The sum of the forces produced by fluid pressure on areas 31 and 33 is opposed by a spring 38 confined in a chamber 39 between land 30 and the end of the valve housing. A chamber 40 between lands 29 and 30 and spring chamber 39 are connected to reservoir R through respective lines 41 and 42. A chamber 43 is defined by lands 28, 29.

Check valves 44, 45 are connected to rod and head end pressure through lines 35, 37 respectively. Fuild at the higher of the two pressures opens one of the check valves 44, 45 and closes the other to provide control pressure fluid via lines 46, 47 to chamber 43. Line 47 also supplies the control pressure fluid to a servo valve 49 and to adjustable linkage 23 through line 50.

Adjustable linkage 23 includes a piston 51 with rod 52 and a piston 53 with rod 54 which are retained in a common cylinder 55. Rod 52 is connected to link 21 and rod 54 is connected to link 22. The displacement of pump 17 is changed relative to the displacement of pump 10 when the distance between the pistons 51, 53 is changed. The pressure fluid in line 50 is connected to the rod end of each piston 51, 53 to bias the pistons together. The cavity 56 between the pistons 51, 53 is supplied with pressure fluid from valve 26 through line 57 to separate the pistons.

Referring again to FIG. 1 where fluid actuator 13 is stationary, the operation of average pressure maintaining valve 26 is as follows. When the sum of the forces produced by rod and head end pressure fluids acting on areas 31, 33 is equal to that of spring 38, spool 27 is stationary and land 29 blocks line 57. If the sum of the forces produced by the pressure fluid acting on areas 31 and 33 exceeds the force of spring 38, spool 27 will move to the right so that line 57 connects with line 46 through chamber 43 to supply pressure fluid to cavity 56. This will move piston 53 to the left and pivot lever 22 to change the displacement of pump 17 to reduce makeup fluid flow to the head end. This reduces head and rod end fluid pressures and reduces the pressure fluid forces on spool 27, allowing spring 38 to shift the spool to the left until equilibrium is reached with land 29 closing line 57.

If the sum of the forces acting on areas 31 and 33 is less than the force of spring 38, the spring will move spool 27 to the left so that line 57 is connected to reservoir R through chamber 40 and line 41. Fluid will then drain from cavity 56, allowing spring 24 to pivot lever 22 counterclockwise, thereby changing the displacement of pump 17 to increase makeup fluid flow to the head end. This increases head and rod end fluid pressures and increases the pressure fluid forces on spool 27. Spool 27 shifts to the right until the force of spring 38 balances the pressure fluid forces on spool 27, with land 29 closing line 57.

Operation of fluid actuator 13 to retract actuator piston 14 is shown in FIG. 2. An electrical controller 58 operates servo valve 49 to effect a desired displacement of pumps 10 and 17 until a desired position of actuator rod 16 is reached, as sensed by a position detector 59. To retract the actuator, controller 58 commands servo valve 49 to supply fluid through line 60 to move piston 20 rightward to a predetermined position. This moves link 21 which gives pump 10 a predetermined stroke and shifts rod 52 to the left. Rod 54 follows to put pump 17 on stroke. Pressure fluid is supplied from pump 10 at a predetermined rate through line 11 to the rod end of actuator 13, while excess fluid from the head end of actuator 13 is pumped through line 18 to reservoir R by pump 17. Thus rod 16 retracts at a predetermined rate until it reaches the preselected position as sensed by detector 59. When in that position a signal from detector 59 causes controller 58 to command servo valve 49 to direct fluid through line 61 to shift piston 20 leftward until pump 10 is at zero stroke and displacement, as shown in FIG. 1.

Operation of the system to extend actuator piston 14 is shown in FIG. 3. To extend the actuator, controller 58 commands servo valve 49 to supply pressure fluid through line 61 to move piston 20 leftward to a predetermined position. This moves link 21 which gives pump 10 a predetermined stroke and spring 24 pivots link 22 counterclockwise to put pump 17 on stroke.

Pressure fluid is supplied from pumps 10, 17 through line 12 to the head end of actuator 13 and piston 14 and rod 16 are moved. Fluid displaced from the rod end of actuator 13 is returned to pump 10 via line 11. Rod 16 will extend at a predetermined rate until it reaches a preselected position as sensed by position detector 59. When it reaches that position, controller 58 will cause servo valve 49 to shift piston 29 rightward until pump 10 is again at zero stroke as shown in FIG. 1.

It should be noted that during retraction of actuator 13, pump 17 is stroked to displace less fluid than when actuator 13 is extended or stationary, since the only fluid which pump 17 must displace is the amount of makeup fluid required by the control system less the amount of excess fluid supplied to pump 10. Pump 17 is stroked the greatest amount during extension of actuator 13 since it must displace additional fluid to the head end of the actuator in addition to supplying makeup fluid to the control system. Operation of average pressure maintaining valve 26 is the same when actuator 13 is retracted, extended or stationary.

Figure 4:
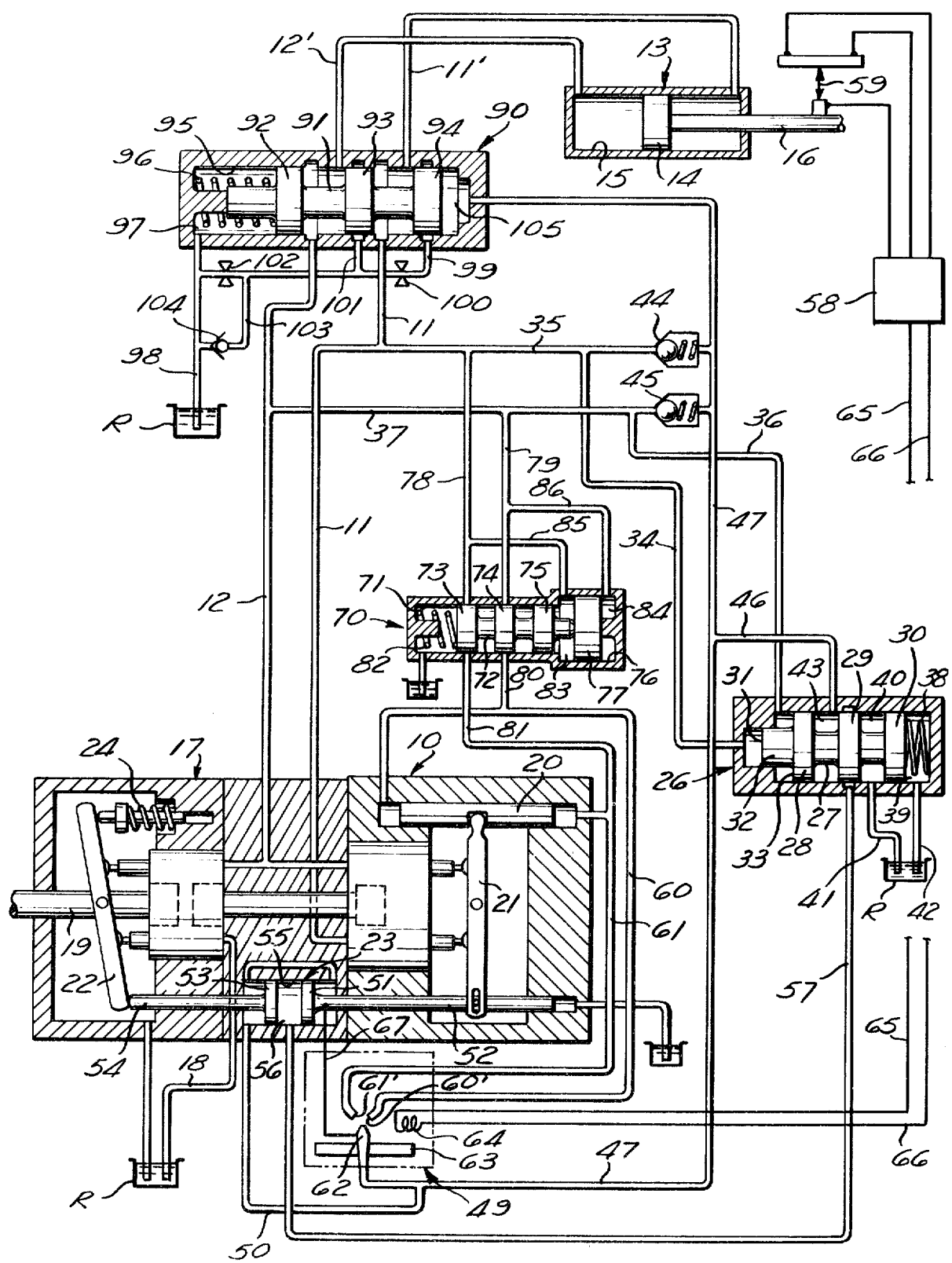
FIG. 4 is a schematic diagram of a more complete hydraulic system according to the first embodiment which includes the best mode of carrying out the invention.

A more complete hydraulic system with features additional to those shown in FIGS. 1–3 is shown in FIG. 4. Valve 49, which operates control piston 20, is of the jettype in which a projector nozzle 62 supplies control pressure fluid to receptor ports 60', 61' in respective lines 60, 61. In its neutral position, nozzle 62 supplies equal amounts of pressure fluid to ports 60', 61' and piston 20 is centered. Nozzle 62 is controlled by a torque motor including an armature 63 which is positioned by a coil 64 which is connected to controller 58 by an electric circuit 65, 66. When actuator 13 is moved, controller 58 energizes coil 64 and nozzle 62 is deflected by the torque motor to supply unequal amounts of fluid to ports 60', 61' to shift control piston 20 as previously described.

A feed-back spring 67 is connected between rod 52 and nozzle 62. When piston 20 reaches the displacement position commanded by controller 58, the feedback spring 67 offsets the deflection force generated by coil 64 and centers nozzle 62 between ports 60', 61' which immobilizes piston 20. As rod 16 approaches the preselected position of extension or retraction as sensed by position detector 59, controller 58 de-energizes coil 64 and the unopposed force of feed-back spring 67 biases nozzle 62 in the opposite direction to supply pressure fluid to the other port to move piston 20 to a zero stroke position simultaneously with rod 16 reaching its preselected position.

In the FIG. 4 embodiment, a pressure limiting valve 70 is included to limit the maximum fluid pressure on either side of piston 14. Valve 70 includes a bore 71 housing a spool 72 with lands 73, 74, 75. Bore 71 opens into a larger bore 76 which houses a piston 77. Bore 71 connects to rod and head end pressures through respective lines 78 and 79 and is connected to either side of control piston 20 by lines 80, 81. A spring 82 normally biases spool 72 rightward so that lands 73, 74 cover lines 78, 79. Rod and head end pressures are conducted to valve chambers 83, 84 through respective branch lines 85, 86. Since it is desirable to have valve 70 respond to a single high pressure, spool 72 and piston 77 are relatively sized to reflect the different pressures on either side of piston 14, where operating pressure may be on the order of 3600 psi on the rod end and 2800 psi on the head end.

When a permissible maximum fluid pressure, say 5000 psi, is exceeded in the rod end of actuator 13, it is sensed in chamber 83 and shifts spool 72 leftward against spring 82 to uncover lines 78, 79 which then connect to respective lines 81, 80. The high rod end fluid pressure in line 81 will shift control piston 20 leftward to adjust the displacement of pumps 10 and 17 until rod end pressure drops. Similary, high head end pressure sensed in chamber 84 will cause piston 77 to shift spool 72 leftward to uncover lines 78, 79. The high head end pressure in line 80 will shift piston 20 rightward to adjust the displacement of pumps 10 and 17 until head end pressure drops.

A bypass valve 90 is incorporated in this embodiment of the instant hydraulic system to disconnect fluid actuator 13 from supply lines 11, 12 if the pressure in these lines falls too low, as for example would happen if one of pumps 10 or 17 failed. Bypass valve 90 comprises a spool 91 with lands 92, 93, 94 slidable in a bore 95. Bore 95 connects to actuator 13 via lines 11', 12' and to pumps 10, 17 via lines 11, 12. A spring 96 is located in a chamber 97 which connects to reservoir R through drain line 98. Line 99, through an orifice 100, and line 101 connect bore 95 to drain line 98 through an orifice 102 and also through line 103 and a check valve 104. Under normal operating conditions the control pressure in line 47 is sensed in chamber 105 and shifts spool 91 to the illustrated position against spring 96 so that lines 11, 12 are connected to lines 11', 12' and lands 93, 94 block lines 101, 99.

A reduction of control pressure below a predetermined amount drops the pressure in line 47 and chamber 105 so that spring 96 shifts spool 91 rightward to a position where lands 92, 93, 94 block lines 11, 12 and uncover lines 99, 101. This interconnects both ends of actuator 13 through lines 11', 99, 101 and 12'. When rod 16 is extended by an external force, fluid outflow from the rod end flows to the head end of actuator 13 at a rate controlled by orifice 100 in line 99. Makeup fluid is drawn from reservoir R to the head end through line 98, check valve 104 in line 103 and lines 99, 101. When rod 16 is retracted by an external force, outflow from the head end will flow to the rod end, with the excess going to reservoir R. The rate of fluid outflow from the head end is controlled by orifice 102 in line 99 and orifice 100. Therefore, bypass valve 90, check valve 104 and orifices 100, 102 keep both sides of actuator 13 full of fluid and maintain a certain amount of damping by limiting the rate of fluid flow from the actuator when actuator 13 is disconnected from pumps 10 and 17.

FIG. 5 shows the second embodiment of a system for controlling the fluid pressure on a fluid actuator according to the instant invention. A first variable displacement axial piston pump 210 is connected through hydraulic lines 211 and 212 to an unbalanced fluid actuator 213. Actuator 213 has a movable piston 214 which reciprocates in a cylinder 215 and a rod 216 which is attached to piston 214 and projects from one end of the actuator 213 for attachment to a load, not shown.

A second variable displacement pump 217 is connected to reservoir R through line 218 and to the head end of actuator 213 through line 212. Pump 217 supplies fluid, additional to that supplied by pump 210, to the head end of actuator 213 when it is being extended and conducts excess fluid that cannot be used by pump 210 from the head end to reservoir R when it is being retracted.

The pumps 210, 217 are driven by a prime mover, not shown, from a shaft 219. A servo valve 220 is connected to each end of a displacement control piston 221 through lines 222, 223. Valve 220 operates control piston 221 as previously described to control the displacement of pumps 210, 217. Control piston 221 is connected to pump 210 through a pivoted mechanical link 224. A similar link 225 on pump 217 is connected to link 224 by a rigid mechanical link 226. In this way pump 217 operates simultaneously with pump 210 to provide additional fluid or to swallow excess fluid when the actuator is operated.

A makeup pump 227 driven by a prime mover, not shown, provides fluid to make up leakage in the hydraulic system. Makeup pump 227 is connected to reservoir R through line 228 and to a port 229 in an average pressure maintaining valve 230 through line 231. Valve 230 maintains the sum of the pressures on piston 214 at a predetermined level. Pump 227 also supplies fluid to operate servo valve 220 through lines 231, 232. Additionally, pump 227 is connected to a relief valve 233 which regulates the pressure of the fluid supplied by pump 227 through line 234.

Average pressure maintaining valve 230 includes a spool 235 having lands 236, 237 and is movable in a bore 238. Land 236 has a first area 239 formed on a projection 240 and an equal second area 241 formed around the base of projection 240. Area 239 is connected to rod end fluid pressure of actuator 213 through lines 243, 244 and 211, while area 241 is connected to head end fluid pressure through lines 245, 246 and 212. The sum of the forces produced by fluid pressures acting on areas 239, 241 is opposed by a spring 247 confined in a chamber 248 between land 237 and the end of the valve housing. A chamber 249 is defined between lands 236, 237. Chamber 249 is connected through lines 244, 211 to rod end pressure fluid and to head end pressure fluid through lines 244, 246 and 212.

Referring again to FIG. 5, the operation of average pressure maintaining valve 230 is as follows. When the sum of the forces produced by rod and head end pressure fluids acting on areas 239, 241 is equal to that of spring 247, spool 235 is stationary and land 236 closes port 229. If the sum of the forces produced by the pressure fluids acting on areas 239, 241 is less than the force of spring 247, spool 235 moves to the left and land 236 opens port 229 to supply makeup fluid to the head and rod ends of actuator 213 through chamber 249. Makeup fluid is supplied from chamber 249 through lines 244 and 211 to the rod end and through lines 244, 246 and 212 to the head end until rod and head end fluid pressure fluids acting on areas 239, 241, respectively, is sufficient to overcome spring 247 and move spool 235 to the right, thereby closing port 229.

If the sum of the forces produced by the pressure fluids acting on areas 239, 241 exceeds the force of spring 247, spool 235 will move to the right to connect chamber 249 to a port 250 which is connected to reservoir R through line 251. This will reduce head and rod end fluid pressures and will reduce the pressure fluid forces on spool 235, allowing spring 247 to shift the spool to the left until equilibrium is reached, with land 237 closing the port 251.

Thus, it can be seen that in the second embodiment of the instant invention an auxiliary makeup pump supplies makeup fluid to an average pressure maintaining valve which sums the fluid pressure on each side of an unbalanced actuator and supplies the makeup fluid to each side of the actuator to make up fluid losses in the system and maintain a predetermined average pressure thereon.

FIG. 6 shows the third embodiment of a system for controlling the fluid pressure on a fluid actuator according to the instant invention. A variable displacement axial piston pump 310 is connected through hydraulic lines 311 and 312 to a balanced fluid actuator 313. Actuator 313 has a piston 314 which reciprocates in a cylinder 315 and a pair of rods 316 and 317 which are attached to one and the other sides of piston 314, respectively, and project from actuator 313 for attachment to a load, not shown. A single pump will satisfactorily operate a balanced actuator since it displaces equal volumes of fluid on each side of the piston when it is operated.

Pump 310 is driven by a prime mover, not shown, from a shaft 318. A servo valve 319 is connected to one end of a displacement control piston 320 through a hydraulic line 321. Control piston 320 is biased to the left to put pump 310 on stroke in one direction by fluid from valve 319. A spring 322 opposes the leftward movement of control piston 320 and operates to put pump 310 on stroke in the other direction in a well known manner.

A makeup pump 323 driven from shaft 318 provides fluid to makeup fluid leakage in the hydraulic system. One side of makeup pump 323 is connected to reservoir R through line 324 and the other side is connected to a port 325 in an average pressure maintaining valve 326 through a line 327. Valve 326 maintains the sum of the pressures on each side of piston 314 at a predetermined level. Pump 323 also supplies fluid to operate servo valve 319 through lines 327, 328. Additionally, pump 323 is connected to a relief valve 329 which regulates the pressure of the fluid supplied by pump 323 through line 330.

Average pressure maintaining valve 326 includes a spool 331 having lands 332, 333 and is movable in a bore 334. Land 333 has a first area 335 formed on a projection 336 and an equal second area 337 formed around the base of the projection. Area 335 is connected to one end of actuator 313 through lines 338 and 312 while area 337 is connected to the other end of actuator 313 through lines 339 and 311. The sum of the forces produced by pressure fluids acting on areas 335, 337 is opposed by a spring 340 which is confined in a chamber 341 between land 332 and the end of the valve housing. A second chamber 342, defined between lands 332, 333, is connected to the one end of actuator 313 through lines 343, 344, 338 and 312 and to the other end of actuator 313 through lines 343, 339 and 311.

Referring again to FIG. 6, the operation of average pressure maintaining valve 326 is as follows. When the sum of the forces produced by pressure fluids acting on areas 335, 337 is equal to that of spring 340, spool 331 is stationary and land 333 closes port 325. If the sum of the pressure fluid forces is less than the force of spring 340, spool 331 moves to the right and opens port 325 to provide makeup pressure fluid to chamber 342 and thence to the one and the other ends of actuator 313. Makeup fluid is supplied to the one and the other ends of actuator 313 until the one and the other end pressure fluids acting on areas 335, 337 respectively is sufficient to overcome spring 340 and move spool 331 to the left thereby closing port 325.

If the sum of the pressure fluid forces produced exceeds the force of spring 340, spool 331 moves to the left to connect chamber 342 to a port 345 which is connected to reservoir R through line 346. This will reduce the end fluid pressures and will reduce the pressure fluid forces on spool 331, allowing spring 340 to shift the spool to the right until the opposing forces on spool 331 are balanced, with land 332 closing port 345.

Thus it can be seen that the instant invention sums the fluid pressure on each side of an actuator and provides sufficient makeup fluid to each side of the actuator to maintain a predetermined average pressure on the actuator.

What is claimed is:

1. A system for controlling a fluid actuator having a movable piston and rod mounted in a bore in the actuator, comprising a variable displacement pump having a movable displacement control, means connecting the pump to the actuator to supply fluid to one side of the actuator and to receive fluid from the other side to move the piston, and a makeup pump for supplying pressure fluid to make up system fluid losses, characterized by the improvement comprising actuator pressure control means for controlling the average of the fluid pressure acting on each side of the actuator including means for setting a desired average of the fluid pressures, means for sensing the average of the fluid pressures and means for providing makeup pressure fluid to the actuator to increase the fluid pressures when the sensed average of the fluid pressures is less than the set average of the fluid pressure.

2. A system for controlling a fluid actuator as recited in claim 1, characterized in that the actuator pressure control means includes a valve having a body and a spool movable in a bore in the body, the setting means includes a spring in the valve biasing the spool in one direction, and the sensing means includes a first area on the spool connected to pressure fluid on one side of the actuator and a second area on the spool connected to pressure fluid on the other side of the actuator, the one and the other side pressure fluids acting on the respective first and second areas to produce a force opposing the spring.

3. A system for controlling a fluid actuator as recited in claim 2, characterized by a first conduit connecting at least one side of the fluid actuator with the actuator pressure control means, a second conduit connecting the makeup pressure fluid with the actuator pressure control means and a third conduit connecting the reservoir with the actuator pressure control means, whereby the spool is alternatively movable to connect the first and second conduits for passage of makeup fluid to the actuator when the sum of the forces produced by the sensed fluid pressures is less than the force of the spring, and the spool is movable to connect the first and third conduits for passage of actuator pressure fluid to the reservoir when the sum of the forces produced by the sensed fluid pressure is greater than the force of the spring.

4. A system for controlling an unbalanced fluid actuator having a movable piston and rod mounted in a bore in the actuator, comprising a first variable displacement pump having a movable displacement control, means connecting the pump to the actuator to supply fluid to one end of the actuator and to receive fluid from the other end to move the piston, a second variable displacement pump having a movable displacement control, second means connecting the second pump to the head end of the actuator and to reservoir to translate fluid between the head end and reservoir when the piston is moved, and third means connecting the first pump displacement control to the second pump displacement control to provide simultaneous movement of the two displacement controls when the first pump control is moved, characterized by the improvement comprising actuator pressure control means for controlling the average of the fluid pressures acting on the piston, including means for selecting a desired average of the fluid pressures, means for sensing the average of the fluid pressures, and adjustment means for adjusting the third connecting means to change the relative displacements of the pumps whenever the sensed average of the fluid pressures deviates from the selected average of the fluid pressures.

5. A system for controlling an unbalanced fluid actuator as recited in claim 4, characterized in that the actuator pressure control means includes a valve having a body and a spool movable in a bore in the body, the selecting means includes a spring in the valve biasing the spool in one direction, and the sensing means includes a first area on the spool connected to rod end pressure fluid and a second area on the spool connected to head end pressure fluid, the rod and head end pressure fluids acting on the respective first and second areas to bias the spool in opposition to the spring, and means for providing a control pressure selected from the higher of rod or head end pressure.

6. A system for controlling an unbalanced fluid actuator as recited in claim 5, characterized in that the adjustment means includes a land on the movable valve spool having one side connected to control pressure and the other side connected to reservoir, and a conduit between the bore in the valve body and the third connecting means which is covered by the land when the selected average of the fluid pressures and the sensed average of the fluid pressures are the same, whereby the spool is moved to supply control pressure fluid to the conduit to adjust the third connecting means to change the relative displacement of the first and second pumps when one of the sensed average of the fluid pressures or selected average of the fluid pressures exceeds the other and the spool is moved to connect the conduit to the reservoir to adjust the connecting means to change the relative displacement of the first and second pumps when the other of the sensed average of the fluid pressures or selected average of the fluid pressures exceeds the one.

7. A system for controlling an unbalanced fluid actuator as recited in claim 6, characterized in that the third connecting means includes a second piston having a second rod connected to the first pump displacement control, a third piston having a third rod connected to the second pump displacement control, means biasing the second and third pistons together, and a fluid chamber which separates the second and third pistons and connects to the conduit, whereby the chamber expands to change the second pump displacement relative to the first pump displacement when control pressure fluid is supplied to the conduit and the chamber contracts to change the second pump displacement relative to the first pump displacement when the conduit is connected to reservoir.

8. A system for controlling an unbalanced fluid actuator as recited in claim 7, characterized by having means for operating the first pump displacement control, including a movable control piston connected to the first pump displacement control, a servo valve for operating the control piston, and an electrical controller for the servo valve.

9. A system for controlling an unbalanced fluid actuator as recited in claim 8, characterized by having pressure limiting means for limiting the maximum head or rod end fluid pressure, including second means for sensing rod and head end pressure fluid, second selecting means for selecting the maximum allowable head or rod end fluid pressure, and fourth connecting means connecting the pressure limiting means to the control piston, whereby the pressure limiting means supplies the greater of head or rod end pressure fluid through the fourth connecting means to the control piston to override the servo valve and reduce the displacement of the first and second pumps when a sensed head or rod end fluid pressure is greater than the second selected pressure.

10. A system for controlling an unbalanced fluid actuator as recited in claim 9, characterized in that the pressure limiting means includes a pressure limiting valve having a body and a spool movable in a bore in the body, the second sensing means includes a first area on the pressure limiting valve spool connected to rod end fluid pressure and an enlarged piston movable in the pressure limiting valve body bore connected to head end fluid pressure on one side and to rod end fluid pressure on the other side to enable the pressure limiting means to respond to the same maximum pressure for head end and rod end fluid and the second selecting means includes a spring in the pressure limiting valve body which opposes the second sensing means.

11. A system for controlling an unbalanced fluid actuator as recited in claim 8, characterized by including a bypass means for disconnecting the fluid actuator from the first and second pumps if control pressure falls below a predetermined minimum including, third sensing means for sensing control pressure, third selecting means for selecting a minimum contact pressure, and fifth connecting means operatively connecting the first and second pumps to the fluid actuator through the bypass means, whereby the bypass means renders the fifth connecting means inoperative and disconnects the fluid actuator from the first and second pumps when control pressure falls below the third selected pressure.

12. A system for controlling an unbalanced fluid actuator as recited in claim 11, characterized in that the bypass means includes a bypass valve having a body and a spool movable in a bore in the body, the third sensing means includes a land on the bypass valve spool acted upon by control pressure, and the third selecting means includes a spring in the bypass valve body which biases the valve spool in opposition to the control pressure.

13. A system for controlling an unbalanced fluid actuator having a movable piston and rod mounted in a bore in the actuator, comprising a first variable displacement pump having a movable displacement control, means connecting the pump to the actuator to supply fluid to one end of the actuator and to receive fluid from the other end to move the piston, a control piston to operate the first pump displacement control, a second variable displacement pump having a movable displacement control, second means connecting the second pump to the head end of the actuator and to reservoir to translate fluid between the head end and reservoir when the piston is moved in another direction, and third means connecting the first pump displacement control to the second pump displacement control to provide simultaneous movement of the two displacement controls when the first pump control is moved, the third connecting means including adjustment means to move the second pump displacement control relative to the first pump displacement control, characterized by the improvement comprising actuator pressure control means for controlling the average of the fluid pressures acting on the piston including a valve having means for selecting a desired average of the fluid pressures, means for sensing the average of the fluid pressures acting on the piston, conduit means for supplying control fluid selected from the higher of rod or head end fluid to the valve and the valve is operable to supply control fluid to the adjustment means when one of the sensed or selected average of the fluid pressures deviates from the other, pressure limiting means for limiting the maximum head or rod end fluid pressure including, a second normally closed valve having second sensing means for sensing head and rod end pressure fluid, and second selecting means for selecting the maximum allowable head or rod end fluid pressure, fourth means connecting the pressure limiting means to the control piston, whereby the second sensing means is operable to open the second valve and supply head and rod end pressure fluid to the control piston to reduce the displacement of the first and second pumps when the second sensed head or rod end fluid pressure exceeds the second selected pressure, and bypass means for disconnecting the fluid actuator from the first and second pumps if control pressure falls below a predetermined minimum including a third normally open valve through which the first and second pumps are connected to the fluid actuator, the third valve having third sensing means for sensing control pressure, third selecting means for selecting a minimum control pressure, whereby the third sensing means overcomes the third selecting means and operates to close the third valve and disconnect the first and second pumps from the fluid actuator when control pressure falls below the third selected pressure.

14. A system for controlling an unbalanced fluid actuator having a movable piston and rod mounted in a bore in the actuator, comprising a first variable displacement pump having a movable displacement control, means connecting the first pump to the actuator to supply fluid to one end of the actuator and to receive fluid from the other end to move the piston, a second variable displacement pump having a movable displacement control, second means connecting the second pump to the head end of the actuator and to reservoir to translate fluid to the head end when the piston moves in one direction and to reservoir when the piston is moved in another direction, characterized by the improvement comprising third means connecting the first pump displacement control to the second pump displacement control to provide simultaneous movement of the two displacement controls when the first pump control is moved such that the second pump translates a volume of fluid equal to the difference of fluid volumes displaced by the head and rod ends of the actuator as it is operated.

15. A system for controlling an unbalanced fluid actuator as recited in claim 14, characterized by the third connecting means including means for adjusting the displacement of the second pump relative to the displacement of the first pump.

16. A system for controlling an unbalanced fluid actuator as recited in claim 15, characterized by the adjustment means including a second piston movable in a second cylinder, a second rod connected to the second piston and the first pump displacement control, a third piston movable in the cylinder, a third rod connected to the third piston and the second pump displacement control, an expansible and contractible fluid chamber between the second and third pistons, and means for supplying fluid to or draining fluid from the fluid chamber to thereby move the second pump displacement control relative to the first pump displacement control.

* * * * *

UNITED STATES PATENT OFFICE
CERTIFICATE OF CORRECTION

PATENT NO. : 3,955,369
DATED : May 11, 1976
INVENTOR(S) : Charles A. Kubilos

It is certified that error appears in the above-identified patent and that said Letters Patent are hereby corrected as shown below:

Column 1, line 18 the word flutter should be quoted.

Column 1, lines 20, 31 and 44 the word stiffness should be quoted.

Column 2, line 6 the word "adusting" should be "adjusting".

Column 3, line 4 the word "third" should be "fluid".

Column 3, line 42 the word "in" (being used for the second time) should be "on".

Column 5, line 9, "piston 29" should read "piston 20".

Column 11, line 21 the word "umbalanced" should be "unbalanced".

Column 11, line 41 the word "contact" should be "control".

Signed and Sealed this

Twenty-seventh Day of July 1976

[SEAL]

Attest:

RUTH C. MASON
*Attesting Officer*

C. MARSHALL DANN
*Commissioner of Patents and Trademarks*